Feb. 20, 1951
C. H. BOOTH
2,542,470
APPARATUS FOR COMPARING ANGLES
Filed Nov. 22, 1947
2 Sheets-Sheet 1
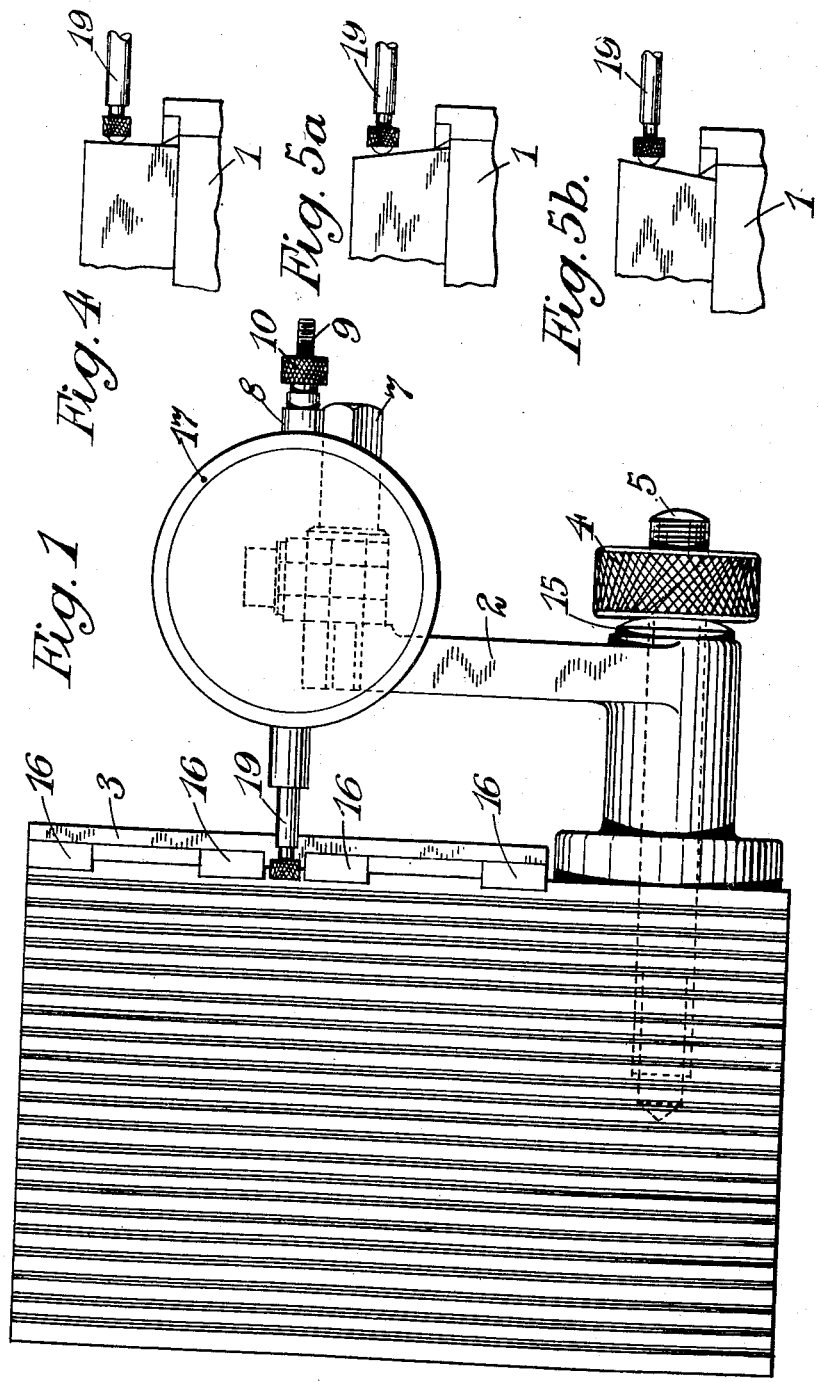
INVENTOR.
CHRISTOPHER HODGSON BOOTH Feb. 20, 1951     C. H. BOOTH     2,542,470
APPARATUS FOR COMPARING ANGLES
Filed Nov. 22, 1947     2 Sheets-Sheet 2
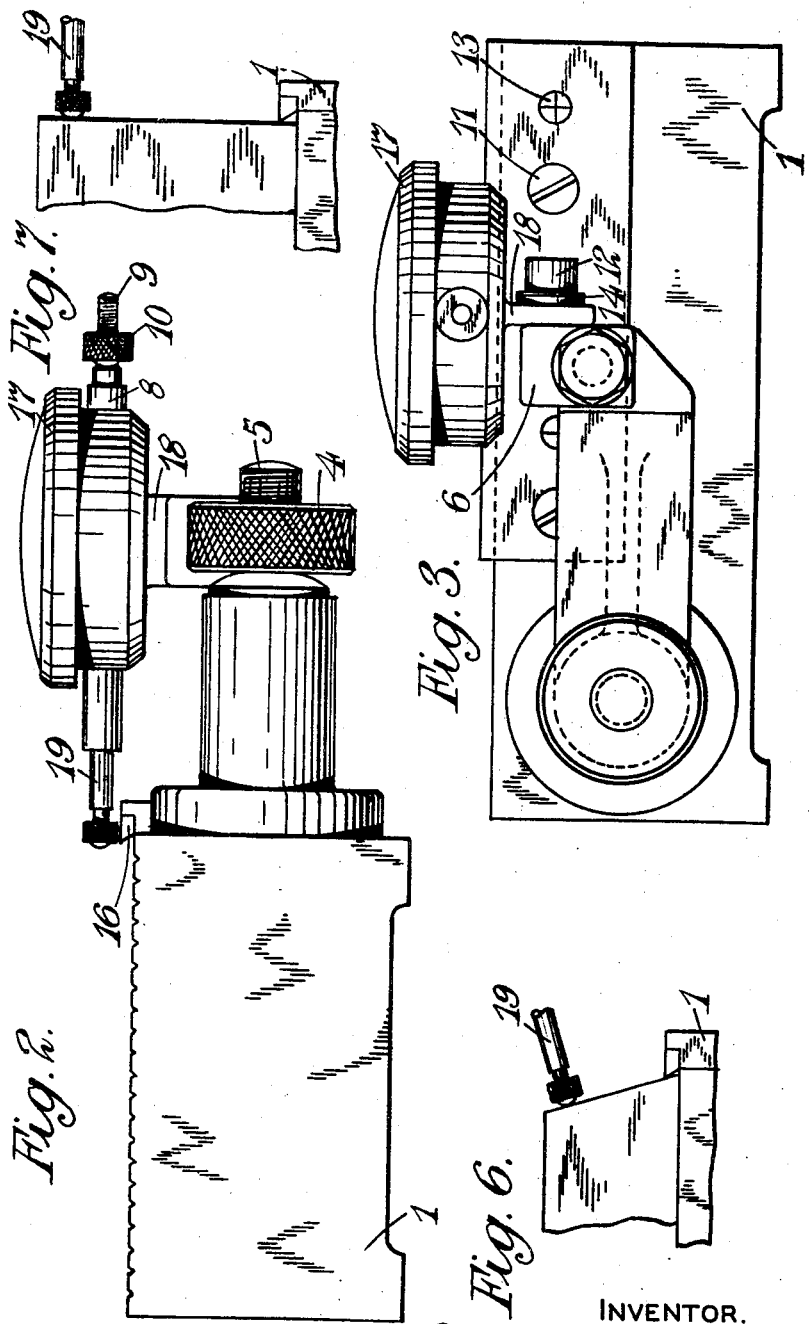
INVENTOR.
CHRISTOPHER HODGSON BOOTH Patented Feb. 20, 1951

2,542,470

UNITED STATES PATENT OFFICE 2,542,470

APPARATUS FOR COMPARING ANGLES

Christopher Hodgson Booth, Sheffield, England, assignor to Firth-Brown Tools Limited, Sheffield, England, a British company Application November 22, 1947, Serial No. 787,571
In Great Britain January 3, 1947

1 Claim. (Cl. 33—174)

This invention relates to a method and apparatus for comparing with a standard the angle between two adjacent sides of a body. Such a comparison is frequently desired in practice. For example, in the manufacture of tools, gauges or machine parts that have to fit accurately into rectangular slots it is essential that the four engaging sides should be at right angles to one another and it is desirable to have simple, accurate and reliable means for measuring each of the angles as the work of fitting progresses. Methods of measuring the angle between two adjacent sides of a body are known but are not entirely satisfactory in practice. It is an object of the present invention to provide a method and apparatus whereby comparisons with a standard of the angle between two adjacent sides of a body may be made quickly and accurately both for sides at right-angles and for sides at angles other than right-angles.

The invention provides the method of comparing with a standard piece the angular relations between two adjacent sides of a testpiece which comprises the steps of positioning one of the two pieces by means engaging one of the aforesaid sides thereof and a part of the other side and recording the position adopted by another part of the said other side at a different distance from the first-mentioned side to provide a measurement of the angular relationship between a line joining the said two parts and the first-mentioned side, measuring in similar manner the like angular relationship of the other piece and comparing the two measurements.

The invention also provides an angle comparator for use in comparing with a standard piece the angular relation between two adjacent sides of a test piece which comparator comprises a surface or the equivalent against which the pieces to be compared may be set in turn with one of the two sides lying against the surface and the other side extending away therefrom, a gauge for engaging the said other side at one distance from the surface and an indicator positioned to engage the said other side at another distance from the surface and arranged for use to determine for each piece an indicator reading, for comparison with that obtained for the other piece, corresponding to the angular relation between the first-mentioned side lying against the surface and a line on the said other side extending between the gauge and the indicator.

Preferably, the surface aforesaid is constituted by a table by which the two pieces may be supported in turn with the side extending from the table abutting against the gauge.

In a conventional arrangement of the comparator the gauge is set on or adjacent to the surface of the table and the indicator is spaced away from the table. Preferably, the indicator is adjustable perpendicularly towards and away from the table or other surface.

A specific embodiment of a comparator according to the invention and the method of using it will now be described by way of example and with reference to the accompanying drawings, in which:

Figure 1 is a plan view of the comparator;

Figure 2 is a side view of the comparator;

Figure 3 is one end view of the comparator; and

Figures 4 to 7 are diagrams illustrating the method of use of the comparator.

The comparator forming the subject of this example comprises a base or table 1, carrying a movable arm 2 locked by a nut 4 and spring washer 15 on a screw-threaded stud 5. The outer end of the arm 2 carries a connection block 6 to which is attached a dial indicator 17 by means of a securing lug 18, the axis of the clamping screws being at right-angles so that the dial indicator may have two degrees of freedom. To the base 1 is attached a plate 3 fitted with inserts 16 constituting a gauge for positioning the test pieces. The plunger 19 of the dial indicator 17 is spring-urged towards the base 1 but the travel of the plunger is limited by means of the finger nut 10 on the screw-threaded spindle 9.

The upper surface of the base 1 is precision lapped and grooved for the clearance of dirt. The inserts 16 have their guiding edges adjacent to the surface of the base 1 accurately aligned. The face of base 1 which engages with the face of the hinged arm 2 is exactly parallel with the guiding edges of the guide inserts 16 and is exactly at right-angles in the vertical plane with the upper precision surface of the base 1.

In the operation of the device for testing rectangular bodies a rectangular standard is placed on the precision surface with a vertical side touching the guide inserts as shown in Figure 4. The dial indicator is adjusted so that the plunger contacts the test piece and shows a suitable reading of the pointer on the dial which is then turned to show zero in the usual manner. The standard is now removed and replaced by an unknown test piece as shown in Figure 4 or Figures 5A and 5B when the indicator reading is zero if the faces are square, plus if the angles are plus, and vice versa. When the upper and lower faces of a block to be tested are parallel the reversal of the block as shown in Figures 5A and 5B will produce a reversal of any error in the face being tested there being a plus error in one case and a minus error in the other with the true zero value denoting a true right-angle midway.

When it is desired to test a body where the faces are not at right-angles, the dial indicator may be adjusted with the plunger at right-angles to the testing face as shown in Figure 6, and a comparison made as before described with a standard test block of known angularity.

By means of the precision hinged arm 2 (see Figure 7) a vertical surface of a body can be tested for flatness vertically by moving the indicator plunger over the surface and as the body may also be moved horizontally against the gauge, the whole vertical surface may be examined.

To provide for the greatest accuracy, the precision surfaces of the base I are hardened and lapped, the gauge inserts are made of a wear resisting material such as tungsten carbide, and a dial indicator of the kind where one scale division equals .0001" or the equivalent is provided.

I claim:

An angle comparator for use in comparing with a standard test piece the angular relation between two adjacent sides of a test piece which comparator comprises a table on which the pieces to be compared may be set in turn with one of the two sides lying against the surface of the table and the other side extending away therefrom, a gauge fixed to the table along one edge of the table and shaped to provide a sharp angular gauge edge spaced above and parallel to the surface of the table to make line engagement with and to position the said other side, an arm secured to the side of the table for pivotal adjusting movement in a plane perpendicular to the plane of the table surface and parallel to the said gauge edge and a dial test indictor carried at the free end of the arm for movement therewith the dial test indicator being of the kind having a spring urged test plunger arranged on axial movement to rotate a pointer over a calibrated dial and the indicator being adjustable for use to engage corresponding parts above the plane of the table of the said other side of the standard and test pieces in turn and to indicate by dial readings the relative positions of said parts with respect to the gauge in a direction substantially perpendicular to the said other side.

CHRISTOPHER HODGSON BOOTH.

REFERENCES CITED

The following references are of record in the file of this patent:

UNITED STATES PATENTS

| Number | Name | Date |
|---|---|---|
| 1,073,089 | Bowers | Sept. 16, 1913 |
| 1,359,943 | Wilhelm | Nov. 23, 1920 |
| 1,480,390 | Hartness | Jan. 8, 1924 |
| 1,615,410 | Shanghnessy | Jan. 25, 1927 |
| 1,769,077 | Small | July 1, 1930 |
| 2,066,699 | Skelton | Jan. 5, 1937 |
| 2,201,454 | Reich | May 21, 1940 |
| 2,242,151 | Sisson | May 13, 1941 |
| 2,324,476 | Becker | July 20, 1943 |
| 2,501,148 | Weiss | Mar. 21, 1950 |

FOREIGN PATENTS

| Number | Country | Date |
|---|---|---|
| 603,608 | Germany | Oct. 4, 1934 |

OTHER REFERENCES

American Machinist, page 745, Nov. 8, 1928.
American Machinist, page 137, Nov. 6, 1947.